US 6,722,666 B2

(12) United States Patent
Yokomachi et al.

(10) Patent No.: US 6,722,666 B2
(45) Date of Patent: Apr. 20, 2004

(54) SEAL STRUCTURE FOR USE IN HOUSING OF COMPRESSOR

(75) Inventors: Naoya Yokomachi, Kariya (JP); Tatsuya Koide, Kariya (JP); Kazuo Murakami, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 10/125,729

(22) Filed: Apr. 18, 2002

(65) Prior Publication Data

US 2002/0167134 A1 Nov. 14, 2002

(30) Foreign Application Priority Data

Apr. 20, 2001 (JP) ...................... P2001-121835

(51) Int. Cl.[7] .............................................. F16J 15/12
(52) U.S. Cl. ...................................... 277/638; 277/650
(58) Field of Search ................................ 277/910, 641, 277/650, 598, 611, 616, 627, 638, 652.3

(56) References Cited

U.S. PATENT DOCUMENTS

| | | | | | |
|---|---|---|---|---|---|
| 3,249,119 | A | * | 5/1966 | Pollack | 137/588 |
| 3,355,181 | A | * | 11/1967 | Olson | 277/611 |
| 3,467,398 | A | * | 9/1969 | Bernard | 277/639 |
| 3,531,133 | A | * | 9/1970 | Sheesley et al. | 277/611 |
| 4,011,029 | A | * | 3/1977 | Shimizu | 417/269 |
| 4,095,809 | A | * | 6/1978 | Smith | 277/611 |
| 4,226,572 | A | * | 10/1980 | Nakayama et al. | 417/269 |
| 4,265,495 | A | * | 5/1981 | Backlin | 384/429 |
| 4,381,178 | A | * | 4/1983 | Nakayama et al. | 417/269 |
| 4,416,190 | A | * | 11/1983 | Ishizuka | 92/71 |
| 4,470,772 | A | * | 9/1984 | Gannaway | 417/368 |
| 4,522,567 | A | * | 6/1985 | Kato et al. | 417/270 |
| 4,652,217 | A | * | 3/1987 | Shibuya | 417/269 |
| 5,244,363 | A | * | 9/1993 | Olson | 417/490 |
| 6,030,184 | A | * | 2/2000 | Ikeda et al. | 417/269 |
| 6,120,259 | A | * | 9/2000 | Miyaji et al. | 417/269 |
| 6,227,814 | B1 | * | 5/2001 | Yokomachi et al. | 417/269 |
| 6,260,851 | B1 | * | 7/2001 | Baron | 277/603 |
| 6,322,086 | B1 | | 11/2001 | Yokomachi et al. | |
| 6,402,159 | B1 | * | 6/2002 | Kohn | 277/608 |
| 6,443,502 | B1 | * | 9/2002 | Iida et al. | 285/351 |
| 2001/0050464 | A1 | | 12/2001 | Kuramoto et al. | |

FOREIGN PATENT DOCUMENTS

| | | | |
|---|---|---|---|
| DE | 19610060 | * | 9/1996 |
| JP | 09-042156 | | 2/1997 |
| JP | 11-343974 | * | 12/1999 |
| JP | 2000-170656 | * | 6/2000 |

* cited by examiner

Primary Examiner—Alison K. Pickard
(74) Attorney, Agent, or Firm—Knoble Yoshida & Dunleavy

(57) ABSTRACT

A seal structure for use in a compressor has a first member, a second member, an O-ring and a gasket. The first member and the second member constitute a housing of the compressor. The first member and the second member are joined to each other at a joint. The O-ring and the gasket are interposed at the joint in a predetermined manner.

7 Claims, 3 Drawing Sheets

SEAL STRUCTURE FOR USE IN HOUSING OF COMPRESSOR

BACKGROUND OF THE INVENTION

The present invention relates to a seal structure for use in a housing of a compressor which constitutes a refrigerant circuit in an air conditioner.

In general, a housing of a compressor includes a plurality of members that is joined with one another by a plurality of bolts. A single seal or a plurality of seals is interposed at a joint between the members so as to prevent gas and lubricating oil from leaking out of the housing.

Unexamined Japanese Patent Publication No. 9-42156 discloses a dual seal structure for use in a housing of a compressor. As shown in FIG. 4, a front case 44 and a motor case 49 are joined by a frame 60 to form the housing. At a joint between the front case 44 and the frame 60, O-rings 72 and 74 are respectively interposed on the inner circumferential side and the outer circumferential side of the housing. In a similar manner, at a joint between the frame 60 and the motor case 49, O-rings 78 and 76 are respectively interposed on the inner circumferential side and the outer circumferential side of the housing. In the above constitution, even if the gas and lubricating oil leak from the inner O-rings 72 and 78, the leaked gas and lubricating oil are sealed by the outer O-rings 74 and 76. Thus, sealing performance is improved.

In recent years, the use of high-pressure gas such as carbon dioxide as a refrigerant for air conditioners has been proposed to reduce environmental problems. However, carbon dioxide tends to permeate a rubber material. For this reason, mere seal structure made of rubber cannot adequately prevent the gas and lubricating oil from leaking even if the dual O-ring is applied.

SUMMARY OF THE INVENTION

The present invention is directed to a simple seal structure for use in a compressor housing whose seal structure ensures substantially high sealing performance and a compressor with the same seal structure.

According to the present invention, a seal structure for use in a compressor has a first member, a second member, an O-ring and a gasket. The first member and the second member constitute a housing of the compressor. The first member and the second member are joined to each other at a joint. The O-ring and the gasket are interposed at the joint.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A first preferred embodiment of the variable displacement type compressor in a vehicle climate control system according to a the present invention will be described with reference to FIGS. 1 and 2. In the compressor, carbon dioxide is used as a refrigerant.

Figure 1:
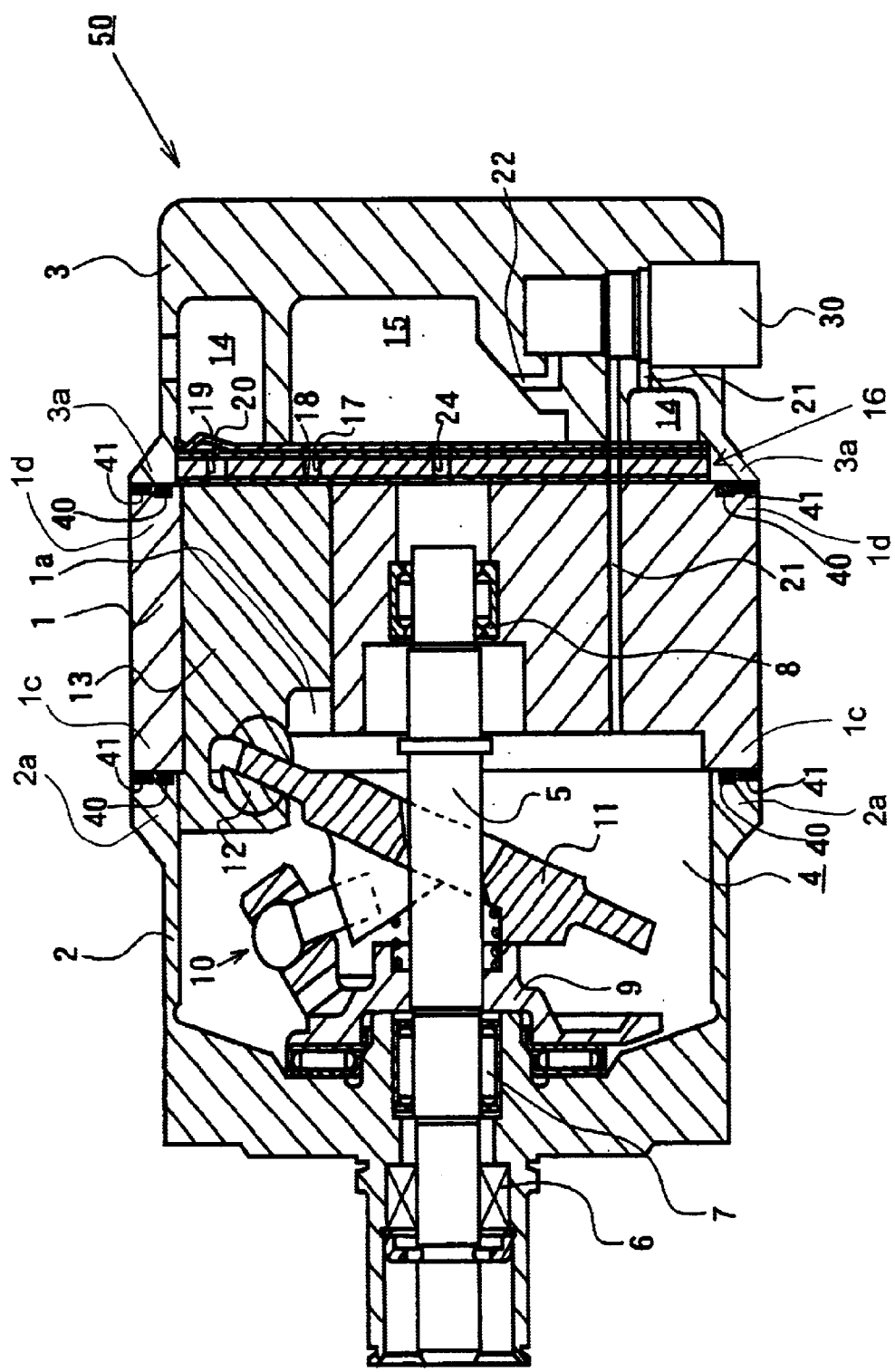
FIG. 1 is a diagram in a cross-sectional view illustrating a variable displacement type compressor according to the present invention.
Figure 2:
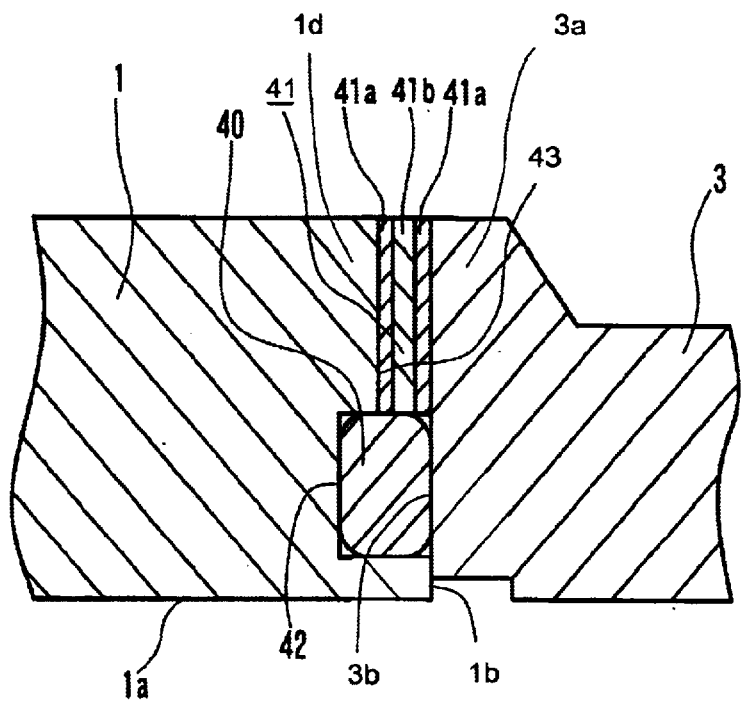
FIG. 2 is a diagram in a partial enlarged view illustrating a first preferred embodiment of the joint for a housing of the variable displacement type compressor according to the present invention.

As shown in FIG. 1, a cylinder block 1, a front housing 2 and a rear housing 3 are fixedly joined to the adjacent members by a plurality of bolts, which is not shown in the drawings, to form a complete housing of a variable displacement type compressor 50. The cylinder block 1, the front housing 2 and the rear housing 3 are made of metallic material such as aluminum. In the first embodiment, a left side of the cylinder block 1 is front and a right side of the cylinder block 1 is rear. A drive shaft 5 is rotatably supported in the front housing 2 and the cylinder block 1 respectively by radial bearings 7 and 8. A shaft seal 6 is mounted on the drive shaft 5 in front of the radial bearing 7. The cylinder block 1 and the front housing 2 define a crank chamber 4. In the crank chamber 4, a rotor 9 is fixedly mounted on the drive shaft 5 while a swash plate 11 is movably placed on the drive shaft 5.

Still referring to FIG. 1, a hinge mechanism 10 is interposed between the rotor 9 and the swash plate 11. The swash plate 11 is movable along the direction of an axis of the drive shaft 5 and inclinable with respect to the axis of the drive shaft 5 due to the hinge mechanism 10. Also, the swash plate 11 is integrally rotated with the drive shaft 5 due to the hinge mechanism 10. As the center of the swash plate 11 moves rearward, the inclination angle of the swash plate 11 decreases with respect to the perpendicular plane to the axis of the drive shaft 5. On the other hand, as the center of the swash plate 11 moves frontward, the inclination angle of the swash plate 11 increases with respect to the perpendicular plane.

In the cylinder block 1, a plurality of cylinder bores 1a is formed to surround the drive shaft 5. A piston 13 is accommodated in each of the cylinder bores 1a. Front side of the piston 13 engages with a distal portion near the outer circumference of the swash plate 11 via a pair of shoes 12. Accordingly, as the drive shaft 5 is rotated, the movement in the direction of the axis of the drive shaft 5 at the distal end of the swash plate 11 is transmitted to the piston 13 through the shoes 12. Consequently, the piston 13 is reciprocated in each of the cylinder bores 1a.

A valve plate assembly 16 is interposed between the cylinder block 1 and the rear housing 3. A suction chamber 15 and a discharge chamber 14 are defined between the valve plate assembly 16 and the rear housing 3.

While the piston 13 moves frontward, the refrigerant in the suction chamber 15 is drawn into the corresponding cylinder bore 1a through a suction port 17 by pushing away a suction valve 18 formed on the valve plate assembly 16. After this suction stroke, the piston 13 moves rearward. At this time, the refrigerant in the cylinder bore 1a is compressed to a predetermined pressure level and is discharged into the discharge chamber 14 through a discharge port 19 by pushing away a discharge valve 20 formed on the valve plate assembly 16.

At the center of the valve plate assembly 16, a bleed passage 24 is formed to communicate the suction chamber 15 with the crank chamber 4, In the cylinder block 1 and the rear housing 3, a supply passage 21 is formed to communicate the discharge chamber 14 with the crank chamber 4. A control valve 30 is placed in the supply passage 21. Also, in the rear housing 3, a pressure sensing passage 22 is formed to sense the pressure in the suction chamber 15.

The refrigerant in the discharge chamber 14 flows into the crank chamber 4 through the supply passage 21 under the control of the control valve 30. At the same time, the refrigerant in the crank chamber 4 flows into the suction chamber 15 through the bleed passage 24. That is, the pressure in the crank chamber 4 varies in accordance with the amount of the refrigerant which flows in and out of the crank chamber 4. The pressure differential between the crank chamber 4 and the cylinder bore 1a which is applied to the piston 13 varies in accordance with the pressure in the crank chamber 4. At this time, a stroke amount of the piston 13 and the inclination angle of the swash plate 11 are varied. Accordingly, discharge capacity is adjusted.

An O-ring 40 and a gasket 41 are each interposed at a joint between a rear wall 2a of the front housing 2 and a front wall 1c of the cylinder block 1 as well as another joint between a rear wall 1d of the cylinder block 1 and a front wall 3a of the rear housing 3. The O-ring 40 and the gasket 41 function as a seal. The O-ring 40 made of rubber has high pressure resistance. The gasket 41 including metallic material has high gas permeation resistance and also seals a relatively wide area because of its plate-like shape.

Then, the joint portion will be explained in detail with respect to FIG. 2. An end surface 1b of the rear wall 1d and an end surface 3b of the front wall 3a are joined to each other. On the outer circumferential side of the end surface 1b, an annular groove 42 is formed for accommodating the O-ring 40. The O-ring 40 is made of nitrile rubber. On the outer circumferential side of the annular groove 42, an end surface 43 is formed for pressing the gasket 41 against the end surface 3b. The gasket 41 is constituted in a such manner that a pair of nitrile rubber plates 41a sandwiches a metallic plate 41b. The gasket 41 is exposed to the outside of the rear wall 1d and the front wall 3a. In the above described manner, another pair of the O-ring 40 and the gasket 41 is interposed at the joint between the rear wall 2a and the front wall 1c.

Now, the function of the above first preferred embodiment of the seal structure of the variable displacement type compressor 50 according to the present invention will be explained. The O-ring 40 is placed closer to each of the cylinder bores 1a than the gasket 41 and has high pressure resistance. Even under the relatively high-pressure of the refrigerant, the O-ring 40 is pressed against both the surface of the annular groove 42 and the end surface 3b due to its transformation in shape, thereby creating a seal between the surface of the annular groove 42 and the end surface 3b. Thus, the O-ring 40 creates a main seal at the joint between the rear wall 1d and the front wall 3a.

Even if the refrigerant leaks from the O-ring 40, the amount of leak is relatively small. That is, the leaked refrigerant is relatively low in pressure. Due to the low pressure, the gasket 41 outside of the O-ring 40 effectively creates a seal at the joint between the end surface 43 and the end surface 3b. Since the metallic material of the gasket 41 has high gas permeation resistance, the gasket 41 has high sealing performance. Thus, the gasket 41 creates an auxiliary seal at the joint between the rear wall 1d and the front wall 3a. Consequently, the O-ring 40 and the gasket 41 create a substantially complete seal at the joint between the cylinder block 1 and the rear housing 3. In the above described manner, another pair of the O-ring 40 and the gasket 41 also creates a substantially complete seal at the joint between the front housing 2 and the cylinder block 1.

In the first embodiment, the following effects are obtained. Firstly, the above seal structure has two advantages. One advantage is the high pressure resistance due to the O-ring 40 that functions as a main seal. The other advantage is the high gas permeation resistance due to the gasket 41 that functions as an auxiliary seal. The second aspect is advantageous for the use of carbon dioxide as refrigerant. Therefore, the above seal structure is much superior in sealing performance to a single seal structure of the O-ring 40 or a dual seal structure of the O-ring 40.

A second preferred embodiment of the variable displacement type compressor in a vehicle climate control system according to the present invention will be described with reference to FIG. 3. In the second preferred embodiment, an O-ring 46 is placed on the outer circumferential side while a gasket 45 is placed on the inner circumferential side. The same reference numerals of the first preferred embodiment are applied to substantially the same components in the second preferred embodiment.

Figure 3:
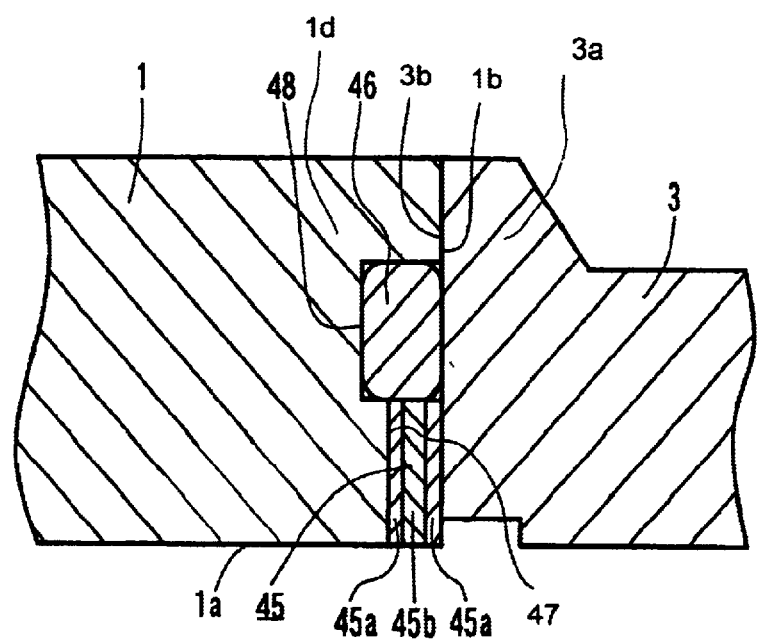
FIG. 3 is a diagram in a partial enlarged view illustrating a second preferred embodiment of the joint for a housing of the variable displacement type compressor according to the present invention.
Figure 4:
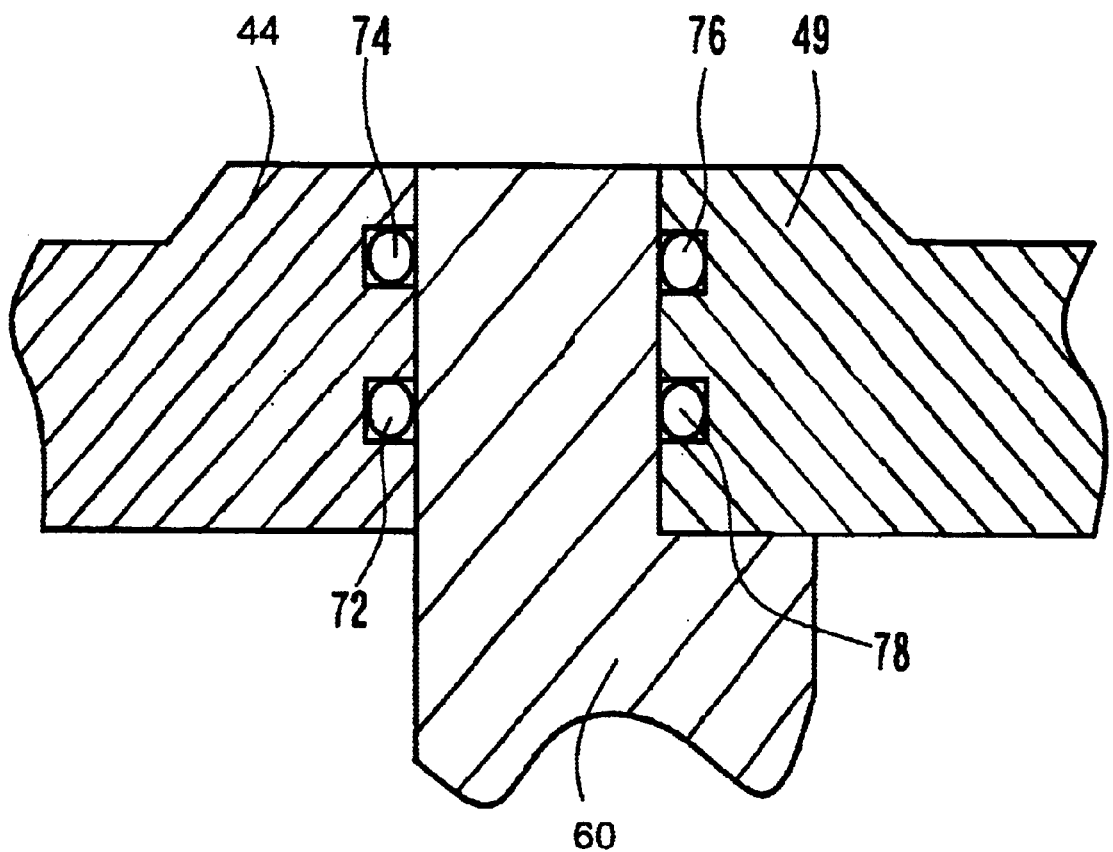
FIG. 4 is a diagram in a partial enlarged view illustrating the joint for a housing of a compressor according to a prior art.

As shown in FIG. 3, the O-ring 46 and the gasket 45 are interposed at the joint between the rear wall 1d and the front wall 3a. The end surface 1b of the rear wall 1d and the end surface 3b of the front wall 3a are joined to each other. On the inner circumferential side of the end surface 1b, an annular groove 48 is formed for accommodating the O-ring 46. The O-ring 46 is made of nitrile rubber. On the inner circumferential side of the annular groove 48, an end surface 47 is formed for pressing the gasket 45 against the end surface 3b. The gasket 45 is constituted in a such manner that a pair of nitrile rubber plates 45a sandwiches a metallic plate 46b. The gasket 45 is exposed to the inside of the rear wall 1d and the front wall 3a. In a similar manner, another pair of the O-ring 46 and the gasket 45 is interposed at the joint between the rear wall 2a and the front wall 1c.

In the second preferred embodiment, the gasket 45 creates a main seal at the joint between the rear wall 1d and the front wall 3a while the O-ring 46 creates an auxiliary seal therebetween. Consequently, the O-ring 46 and the gasket 45 create a substantially complete seal at the joint between the cylinder block 1 and the rear housing 3. In the above described manner, the O-ring 46 and the gasket 45 create a substantially complete seat at the joint between the front housing 2 and the cylinder block 1.

In the second preferred embodiment, the above described effects of the first preferred embodiment are also obtained. In addition, since the gasket 45 including metallic material is not placed on the atmospheric side, but placed on the inner circumferential side of the O-ring 46, the gasket 45 is prevented from being eroded.

In the present invention, the following alternative implementations are also practiced. Firstly, in the above embodiments, the material for the O-rings 40 and 46 is not limited to nitrile rubber. Secondly, the material for the gaskets 41 and 45 is not limited to metallic material and nitrile rubber. Thirdly, the above described compressor is not limited to the compressor in the vehicle climate control system.

As described above, in the present invention, the O-ring and the gasket create a combined seal at a joint between the members constituting the housing of the compressor. Such a seal structure ensures high sealing performance in spite of its simple structure.

The present examples and preferred embodiments are to be considered as illustrative and not restrictive, and the invention is not to be limited to the details given herein but may be modified within the scope of the appended claims.

What is claimed is:

1. A compressor comprising:
   a first housing unit having a first wall for housing at least a first component;
   a second housing unit connected to the first housing unit having a second wall for housing at least a second component, the first wall being in contact with the second wall to form a joint;
   an O-ring located near the joint for sealing the joint; and
   a gasket located near the joint for also sealing the joint, the gasket which is a different member from a valve plate assembly, being made of a metallic plate sandwiched by a pair of rubber plates, the gasket being placed on an outer circumferential side of the first housing unit than the O-ring with respect to a high pressure source.

2. The compressor according to claim 1 wherein the gasket is exposed to the outside of the first housing unit.

3. The compressor according to claim 1 wherein the first wall has an annular groove for housing the O-ring.

4. The compressor according to claim 1 wherein the O-ring and the gasket contact with each other.

5. The compressor according to claim 1 wherein carbon dioxide is used as a refrigerant.

6. The compressor according to claim 1 wherein the O-ring is made of nitrile rubber.

7. The compressor according to claim 1 wherein the first housing unit and the second housing unit include a front housing, a cylinder block and a rear housing.

\* \* \* \* \*